United States Patent
Sharma et al.

(10) Patent No.: US 11,155,503 B2
(45) Date of Patent: Oct. 26, 2021

(54) ANTI-CAKING FERTILIZER COMPOSITIONS

(71) Applicant: SABIC GLOBAL TECHNOLOGIES B.V., Bergen op Zoom (NL)

(72) Inventors: Yogesh Omprakash Sharma, Bangalore (IN); Nilkamal Bag, Bangalore (IN); Boddu Srinivasa Rao, Bangalore (IN); Samik Gupta, Bangalore (IN); Harri Tapio Kiiski, Riyadh (SA); Sahali-Al Saif, Riyadh (SA)

(73) Assignee: SABIC Global Technologies B.V., Bergen op Zoom (NL)

( * ) Notice: Subject to any disclaimer, the term of this patent is extended or adjusted under 35 U.S.C. 154(b) by 49 days.

(21) Appl. No.: 16/612,635

(22) PCT Filed: May 17, 2018

(86) PCT No.: PCT/IB2018/053475
§ 371 (c)(1),
(2) Date: Nov. 11, 2019

(87) PCT Pub. No.: WO2018/211448
PCT Pub. Date: Nov. 22, 2018

(65) Prior Publication Data
US 2020/0199034 A1    Jun. 25, 2020

Related U.S. Application Data

(60) Provisional application No. 62/507,484, filed on May 17, 2017, provisional application No. 62/621,284, filed on Jan. 24, 2018.

(51) Int. Cl.
*C05D 9/00* (2006.01)
*C05B 1/04* (2006.01)
(Continued)

(52) U.S. Cl.
CPC .................. *C05B 1/04* (2013.01); *C05B 1/02* (2013.01); *C05C 9/005* (2013.01); *C05D 5/00* (2013.01);
(Continued)

(58) Field of Classification Search
None
See application file for complete search history.

(56) References Cited

U.S. PATENT DOCUMENTS 2,722,456 A    11/1955    Glessner
2,909,002 A    10/1959    Hendry
(Continued)

FOREIGN PATENT DOCUMENTS

CA    2995400    2/2017
CH    425702 A    12/1996
(Continued)

OTHER PUBLICATIONS

International Search Report and Written Opinion issued in counterpart International Patent Application No. PCT/IB2018/053475, dated Aug. 1, 2018.
(Continued)

*Primary Examiner* — Wayne A Langel
(74) *Attorney, Agent, or Firm* — Norton Rose Fulbright US LLP

(57) ABSTRACT

A particulate fertilizer coating composition or a coated fertilizer containing a solid acidic particulate material and a solid basic particulate material. The coating composition and coated fertilizer are each stable, chemical compatible with other fertilizers, and/or are abrasion resistant.

16 Claims, 3 Drawing Sheets

(51) Int. Cl.
  C05G 5/30    (2020.01)
  C05B 1/02    (2006.01)
  C05C 9/00    (2006.01)
  C05D 5/00    (2006.01)
  C05D 9/02    (2006.01)

(52) U.S. Cl.
  CPC .................. *C05D 9/00* (2013.01); *C05D 9/02* (2013.01); *C05G 5/30* (2020.02)

(56) References Cited

U.S. PATENT DOCUMENTS

| | | | |
|---|---|---|---|
| 3,223,518 A | 12/1965 | Hansen | |
| 3,313,615 A | 4/1967 | Formaini | |
| 3,392,007 A | 7/1968 | Hopewell et al. | |
| 3,419,379 A * | 12/1968 | Goodale | C05C 1/02 71/60 |
| 3,580,715 A * | 5/1971 | Dilday | C05G 5/30 71/28 |
| 3,666,523 A * | 5/1972 | Nau | C05D 9/02 427/214 |
| 3,697,245 A * | 10/1972 | Dilday | C05G 5/36 71/28 |
| 3,938,469 A | 2/1976 | Nau | |
| 4,042,366 A | 8/1977 | Fersch et al. | |
| 4,594,090 A | 6/1986 | Johnson | |
| 4,723,710 A | 2/1988 | Lucore, II | |
| 4,917,304 A | 4/1990 | Mazzei et al. | |
| 5,152,821 A * | 10/1992 | Walter | C05G 5/36 71/33 |
| 5,851,260 A | 12/1998 | Aijala et al. | |
| 6,029,904 A | 2/2000 | Taylor | |
| 6,030,659 A | 2/2000 | Whitehurst et al. | |
| 6,159,263 A | 12/2000 | Greer et al. | |
| 6,413,291 B1 * | 7/2002 | Wommack | C05D 3/00 71/15 |
| 7,393,885 B2 | 7/2008 | Kiyokawa et al. | |
| 8,506,670 B2 | 8/2013 | Varadachari | |
| 8,721,758 B1 | 5/2014 | Miller et al. | |
| 9,004,374 B1 | 4/2015 | Gans | |
| 9,199,883 B2 | 12/2015 | Peacock et al. | |
| 9,439,345 B1 | 9/2016 | Miller et al. | |
| 9,487,452 B2 * | 11/2016 | Ledoux | C05B 1/02 |
| 9,586,869 B1 * | 3/2017 | Burnham | C05G 1/00 |
| 9,856,179 B2 | 1/2018 | Miller et al. | |
| 2002/0186614 A1 | 12/2002 | Millward | |
| 2005/0144997 A1 | 7/2005 | Phillips et al. | |
| 2009/0145190 A1 | 6/2009 | Persinger | |
| 2010/0273885 A1 | 10/2010 | Davis | |
| 2010/0291230 A1 | 11/2010 | Assaraf et al. | |
| 2011/0079062 A1 * | 4/2011 | Smith | C05B 1/02 71/27 |
| 2014/0238514 A1 | 8/2014 | Yarbrough et al. | |
| 2015/0027042 A1 | 1/2015 | Goodwin et al. | |
| 2015/0210604 A1 | 7/2015 | Ledoux | |
| 2015/0239790 A1 * | 8/2015 | Iwig | C05C 9/005 71/28 |
| 2016/0073578 A1 | 3/2016 | Khaleel | |
| 2016/0075607 A1 | 3/2016 | Aqel et al. | |
| 2016/0229763 A1 * | 8/2016 | Wheeler | C05C 11/00 |
| 2016/0318820 A1 * | 11/2016 | Deb | C05D 9/02 |
| 2017/0044078 A1 * | 2/2017 | McLaughlin | C05D 1/02 |
| 2017/0066692 A1 * | 3/2017 | Ledoux | B01J 2/30 |
| 2017/0066693 A1 * | 3/2017 | Ledoux | C05C 9/005 |
| 2018/0222810 A1 * | 8/2018 | Schumski | C05C 9/005 |
| 2018/0370864 A1 * | 12/2018 | Ledoux | C05C 1/02 |
| 2019/0225557 A1 * | 7/2019 | Colpaert | C05G 3/90 |
| 2019/0382321 A1 * | 12/2019 | Garnier | C05G 3/90 |
| 2020/0131098 A1 * | 4/2020 | Hegde | C05G 3/90 |

FOREIGN PATENT DOCUMENTS

| | | |
|---|---|---|
| CN | 1292367 | 4/2001 |
| CN | 1609072 | 4/2005 |
| CN | 1875688 | 12/2006 |
| CN | 102372523 | 3/2012 |
| CN | 102432403 | 5/2012 |
| CN | 102515905 | 6/2012 |
| CN | 102775217 | 11/2012 |
| CN | 206375831 | 8/2017 |
| DE | 102009026234 | 2/2011 |
| EP | 0949221 | 10/1999 |
| EP | 1473992 | 11/2004 |
| EP | 1486477 | 12/2004 |
| EP | 1770079 | 4/2007 |
| EP | 3330241 | 6/2018 |
| FR | 2682554 | 4/1993 |
| FR | 2686861 | 8/1993 |
| GB | 954423 | 4/1964 |
| JP | 2002316888 | 10/2002 |
| RU | 2412140 | 2/2011 |
| WO | WO 1993/010062 | 5/1993 |
| WO | WO 1999/015480 | 4/1999 |
| WO | WO 2001/025168 | 4/2001 |
| WO | WO 2012/064730 | 5/2012 |
| WO | WO 2014/033160 | 3/2014 |
| WO | WO 2014/177932 | 11/2014 |
| WO | WO 2015/132258 | 9/2015 |
| WO | WO 2018/042312 | 3/2018 |

OTHER PUBLICATIONS

"Poly-Feed pHast—Soluble NPK Fertilizers with low pH," Haifa Group, http://www.haifa-group.com/poly-feed%E2%84%A2-phast, Date Accessed: Sep. 2, 2020.

"Production of NPK Fertilizers by the Mixed Acid Route," *European Fertilizer Manufactures Association*, 2000, Booklet No. 8, 1-36.

Burt, "Chemicals for Fertigation," Proc Intl. Irrigation Show: IA's 19th Annual Conference, 1998, 8 pages.

Database WPI; Week 200311 Thomson Scientific, London, GB; AN 2003-116042.

House, "Phosphorus, Arsenic, Antimony, and Bismuth," *Inorganic Chemistry*, 2013, 2:493.

International Search Report and Written Opinion issued in International Patent Application No. PCT/IB2017/055158, dated Nov. 24, 2017.

International Search Report and Written Opinion issued in International Patent Application No. PCT/IB2019/060671, dated Mar. 10, 2020.

International Search Report and Written Opinion issued in International Patent Application No. PCT/IB2014/001392, dated Dec. 10, 2014.

Mosaic, "MicroEssentials SZ" MSDS Revised, dated Dec. 21, 2012.

Office Action issued in corresponding Chinese Application No. 201480023254.3, dated Nov. 1, 2017.

Office Action issued in corresponding European Patent Application No. 14759270.3, dated May 3, 2018.

Office Action issued in corresponding European Patent Application No. 14759270.3, dated Nov. 24, 2017.

Office Action issued in corresponding Gcc Patent Application No. 2017-33903, dated Nov. 8, 2020.

* cited by examiner

ANTI-CAKING FERTILIZER COMPOSITIONS

CROSS REFERENCE TO RELATED APPLICATIONS

This application is a national phase application under 35 U.S.C. § 371 of International Application No. PCT/M2018/053475, filed May 17, 2018, which claims the benefit of priority of U.S. Provisional Patent Application No. 62/507,484 filed May 17, 2017 and U.S. Provisional Patent Application No. 62/621,284 filed Jan. 24, 2018, the entire contents of each of which are hereby incorporated by reference in their entirety.

BACKGROUND OF THE INVENTION

A. Field of the Invention

The invention generally concerns a fertilizer-coating composition, which can be used to coat fertilizers. The coating composition can be in particulate form and can include a solid acidic particulate material and a solid basic particulate material. Such a coating composition can help reduce or eliminate reactions between coated fertilizers having this coating with other fertilizers, including other coated or non-coated fertilizers.

B. Description of Related Art

Blending of multiple fertilizers is a common approach to offer balanced nutrition to crops and plants. Commercial production of blended fertilizers for specific plants or classes of plants can increase the ease of fertilization and complexity of blending at the fertilization site. However, untreated urea, a source of nitrogen used as a fertilizer, is generally not appropriate for the production of bulk blended heterogeneous fertilizer mixtures due to chemical incompatibility. This is especially true for blends that include phosphate fertilizers, such as N—P or N—P—K mixtures, and more especially true for blends with superphosphate (SSP) or triple superphosphate (TSP). Blended mixtures of untreated urea granules with SSP or TSP granules have a tendency to chemically react and form a semisolid or muddy mass which is unmanageable and unusable.

The reason for this incompatibility may be attributed to the following chemical reaction (I):

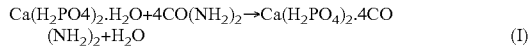

$$Ca(H_2PO4)_2 \cdot H_2O + 4CO(NH_2)_2 \rightarrow Ca(H_2PO_4)_2 \cdot 4CO(NH_2)_2 + H_2O \quad (I)$$

As displayed in the reaction above, when 1 mole of monocalcium phosphate monohydrate, the main component of superphosphate and triple superphosphate, reacts with 4 moles of urea, a urea monocalcium phosphate adduct is formed, and 1 mole of water is released. The adduct has a high solubility and readily dissolves in the water liberated to form a large volume of solution. This results in wetting of granules in the mixture. Due to this, the reaction proceeds at a faster rate.

It remains a challenge to have commercially acceptable means to make urea compatible with superphosphate or triple superphosphate. One solution is to use the more expensive phosphate fertilizers, monoammonium phosphate and diammonium phosphate, or to use ingredients that have different compatibility behaviours. The incapability issues have also at least partially been addressed by coating one or more of the incompatible fertilizers. The coatings are typically produced by coating a fertilizer with a polymer (see WO 2012/064730, and U.S. Pat. No. 9,199,883), a single component barrier such as sulphur or a mineral base (see 10% coating of magnesium oxide on urea available from Ravensdown (New Zeland) under the tradename Flexi-N), or contacting the fertilizer with at least two reactive ingredients to form a coating of a reaction product, such as reacting a liquid acid with a base.

As examples of coatings produced by reaction products, U.S. Pat. No. 3,392,007 disclose the use of multiple alternate coats of ammonium phosphate+MgO and aqueous phosphoric acid until the coating reaches 25-60% of the fertilizer. This produces a water-proofing coat on the fertilizer but also makes it less water soluble. Similarly, WO 1993/010062 discloses applying a liquid mineral acid and an alkali-metal or alkaline-earth metal compound. US Publication No. 2015/0210604 discloses coating with a liquid acid followed by a base (see also U.S. Pat. No. 3,419,379, WO 1999/15480, and WO 2015/132258). U.S. Pat. No. 6,030,659 wets urea granules with acidic solution and then coats with a phosphate salt. FR 2,686,861 describes coating a fertilizer with a mineral base first and then reacting with an aqueous acidic solution to form a solid shell. These disclosures use a liquid component to facilitate a reaction between the coating ingredients to form a coating made of the reaction products. Accordingly, liquid handling is required and the process may require a drying step, which adds to the cost of production.

Some of the issues concerning the current fertilizer coatings include: (1) that they still do not sufficiently inhibit undesirable reactions between the incompatible fertilizers; (2) the coatings may cause delayed release of the fertilizer when used; (3) the coatings may require multiple layer coatings; (4) the coating materials are expensive; and/or (5) non-fertilizer materials are used that do not add a nutritive benefit to the coated fertilizer, essentially diluting the amount of effective fertilizer in the coated fertilizer product. The coating processes may also require special equipment to handle liquid coating materials and may require multiple steps, such as drying steps and/or multiple coating steps.

SUMMARY OF THE INVENTION

A solution has been discovered to at least some of the aforementioned problems associated with incompatible fertilizer blends. The solution is premised on the development of a particulate coating composition that contains a solid acidic particulate material and a solid basic particulate material. The coating composition can be used to coat fertilizer particles (fertilizer particles and fertilizer granules can be used interchangeably throughout the specification) to produce coated fertilizers. The coated fertilizers of the present invention can be safely blended with other fertilizers, as the coated fertilizers are less reactive or non-reactive with the other fertilizers in the blend. The other fertilizers in the blend can be fertilizers coated with other coating materials and/or can be un-coated fertilizers. In either instance, and without wishing to be bound by theory, the particulate coating compositions of the present invention can reduce or inhibit the above-referenced chemical reaction (I) from occurring, thereby reducing or preventing the production of water. This chemical stability between the coated fertilizers of the present invention with other fertilizer materials allows for the production of a variety of different fertilizer blends, which can be beneficial in developing specific fertilizer blends for selected crops and/or plants. Still further, the particulate coating composition of the present invention can impart increased abrasion resistance and/or increased tensile strength to the resulting coated fertilizer. Notably, the use of particulate material for the coating compositions of the present invention can advantageously reduce production expenses, as the use of liquid coating materials and corresponding drying steps do not have to be used. This ease of manufacture can result in a scalable and economically efficient fertilizer coating process.

In one aspect of the present invention, a particulate fertilizer-coating composition is disclosed that contains a solid acidic particulate material and a solid basic particulate material. The particulate fertilizer-coating composition can be a blend of the solid acidic particulate material and the solid basic particulate material. In some instances, the particulate fertilizer-coating composition is a product containing the acidic particulate material and the solid basic particulate material packaged separately from each other, for later mixing or layering in one or multiple layers on a fertilizer particle.

The solid acidic particulate material can contain a solid acidic fertilizer particulate material. The solid acidic particulate material can contain a phosphate-based fertilizer, a biostimulant, a calcium lignosulfonate, or a combination thereof. The solid acidic particulate material can be SSP, TSP, or a blend of SSP and TSP particles.

The solid basic particulate material can contain a metal oxide. The metal oxide can be MgO, ZnO, CuO, or blends thereof.

In some aspects, the solid acidic particulate material and solid basic particulate material do not react with each other to form an adduct or do not react sufficiently with each other to form more than a trace amount of an adduct (e.g., salt formed from an acid-base reaction). The particulate coating composition can contain trace amounts to no adduct formed from the solid acidic particulate material and solid basic particulate material. The particulate coating composition can contain less than 0.01 wt. %, less than 0.001 wt. %, less than 0.0001 wt. %, less than 0.00001 wt. %, or no adduct formed from the solid acidic particulate material and solid basic particulate material, based on the weight of the particulate coating composition.

The particulate coating composition can contain the solid acidic particulate material and the solid basic particulate material at ratios by weight of 1:100 to 7:10, preferably 1:100 to 2:3, more preferably 1:7 to 2:3, or even more preferably about 1:7 to 1:4, or most preferably about 4:21 in the coating composition. The particulate coating composition can contain 0.1 to 20 wt. %, preferably 10 to 20 wt. %, more preferably 14 to 18 wt. %, or most preferably 16 wt. % of the solid acidic particulate material and 80 to 100 wt. %, preferably 80 to 90 wt. %, more preferably 82 to 86 wt. %, or most preferably about 84 wt. %, of the solid basic particulate material based on the weight of the coating composition.

In another aspect of the present invention, there is disclosed a fertilizer particle that has at least a portion of its surface coated with a particulate coating composition of the present invention. The particulate coating composition can be a single layer coating that includes a blend/mixture of the solid acidic particulate material and the solid basic particulate material. In other instances, however, the particulate coating composition can be a multi-layer coating. The multi-layer coating can include a first coating layer containing the solid acidic particulate material and a second coating layer containing the solid basic particulate material, or vice versa. At least a portion of the first coating layer can be positioned between the surface of the fertilizer particle and the second coating layer.

The fertilizer particle coated by the particulate coating composition can be a urea-based fertilizer particle and/or a phosphate-based fertilizer particle. The urea-based fertilizer particle can be a urea particle. The phosphate-based fertilizer particle can be a SSP particle, a TSP particle, or a blend of SSP and TSP particles.

The coated fertilizer particle can contain any amount of the components therein. In some instances, the coated fertilizer particle can contain less than 10 wt. %, such as 1 to 5 wt. %, 2 to 3.5 wt. %, or 2.5 wt. % of the solid basic particulate material based on the total weight of the coated fertilizer. The coated fertilizer can contain less than 5 wt. %, such as 0.01 to 3 wt. %, 0.1 to 2 wt. %, or 0.5 wt. % of the solid acidic particulate material based on the total weight of the coated fertilizer. The coated fertilizer particle can contain 85 to 98.5 wt. %, 90 to 98 wt. %, 95.5 to 97.9 wt. %, or 97 wt. % of the fertilizer coated based on the total weight of the coated fertilizer. The coated fertilizer can contain a micronutrient. The micronutrient can be present in the coated fertilizer in an amount of 0.5 to 10 wt. %, 1 to 5 wt. %, or 2 to 4 wt. %, based on the total weight of the coated fertilizer. In some instances, the coated fertilizer particle contains 95.5 to 97.9 wt. % of the fertilizer particle urea, 2 to 3.5 wt. % of the solid basic particulate material MgO, and 0.1 to 2 wt. % of the solid acidic particulate material SSP or TSP. In some instances, the coated fertilizer particle contains 95.5 to 97.9 wt. % of the fertilizer particle urea, 2 to 3.5 wt. % of the solid basic particulate material MgO, 0.1 to 1 wt. % of the solid acidic particulate material SSP, and 0.1 to 1 wt. % of the solid acidic particulate material TSP.

A coated fertilizer composition of the present invention can include a plurality of the coated fertilizer particles. The composition can also be a blend of the plurality of the coated fertilizer particles that are mixed with other fertilizer particles. The other fertilizer particles can be fertilizer particles coated with other coating materials and/or un-coated fertilizer particles. Such fertilizer blends of the present invention can be formulated for a desired fertilizer characteristic. By way of example, a blended fertilizer composition of the present invention can be formulated into a quick release fertilizer. Alternatively, the blend can be formulated into a slow-release fertilizer. In some instances, the composition is formulated into a specialty fertilizer having a desired NPK grade. In one aspect of the present invention, the coated fertilizer is comprised in a blended fertilizer composition further comprising a plurality of uncoated fertilizer particles. In some instances, the coated fertilizer particles of the present invention are combined with uncoated phosphate fertilizer particles (e.g., SSP, TSP, monoammonium phosphate (MAP), and/or diammonium phosphate (DAP) particles, or any combination thereof), uncoated urea-based fertilizer particles (urea particles), and/or uncoated potassium-based fertilizer particles (e.g., potash such as muriate of potash (MOP) or sulfate of potash (SOP)). Any combination of blends of the coated fertilizer particles of the present invention and other fertilizer particles is contemplated in the context of the present invention. This can allow for the creation of specialty fertilizers with desired NPK grades that are designed for specific fertilizer applications.

Also disclosed in the context of the present invention is a method of producing a fertilizer composition. The method can include contacting a plurality of fertilizer particles with a particulate fertilizer coating composition of the present invention. In one instance, the method can include (a) contacting a plurality of fertilizer particles with a first particulate coating composition containing a solid acidic particulate material to form a first coating layer; and (b)

contacting the plurality of fertilizer particles of step (a) with a second particulate coating composition containing a solid basic particulate material to form a second coating layer, wherein at least a portion of the first coating layer is positioned between the surface of the plurality of fertilizer particles and the second coating layer. The processes disclosed herein may further include the step of adding one or more additional fertilizer(s), secondary nutrient(s), trace element(s), plant protection agent(s), and/or filler(s) into the fertilizer coat and into the fertilizer particle to be coated. Alternatively, the method of producing a fertilizer composition of the present invention can include contacting a plurality of fertilizer particles with a particulate fertilizer coating composition comprising a combination of solid acidic particulate material and a solid basic particulate material, such that a single-layer coating can be formed on the fertilizer particles. The coating can include a mixture or blend of the solid acidic and solid basic particulate materials. In one aspect of the present invention, a method of producing a fertilizer blend is disclosed. The method can include combining any one of the coated fertilizer particles disclosed herein with one or more of additional fertilizer(s), secondary nutrient(s), trace element(s), plant protection agent(s), and/or filler(s).

In one aspect of the present invention, disclosed is a method of fertilizing. The method can include applying a fertilizer composition to at least one of a soil, an organism, a liquid carrier, a liquid solvent, or a combination thereof.

Also disclosed are the following Embodiments 1 to 19 of the present invention. Embodiment 1 is a fertilizer composition comprising a fertilizer particle having at least a portion of its surface coated with a particulate coating composition comprising a solid acidic particulate material and a solid basic particulate material. Embodiment 2 is the fertilizer composition of Embodiment 1, wherein the fertilizer particle is a urea-based fertilizer particle or a phosphate-based fertilizer particle. Embodiment 3 is the fertilizer composition of Embodiment 2, wherein the fertilizer particle comprises a single superphosphate (SSP), a triple superphosphate (TSP), or a combination thereof. Embodiment 4 is the fertilizer composition of any of Embodiments 1 to 3, wherein the solid acidic particulate material comprises at least one of a phosphate-based fertilizer, a biostimulant, a calcium lignosulfonate, or a combination thereof. Embodiment 5 is the fertilizer composition of Embodiment 4, wherein the solid acidic particulate material is a phosphate-based fertilizer selected from a solid particulate SSP, a solid particulate TSP, or a blend of solid particulate SSP and solid particulate TSP. Embodiment 6 is the fertilizer composition of any of Embodiments 1 to 5, wherein the solid basic particulate material comprises a metal oxide, preferably MgO, ZnO, CuO, or blends thereof. Embodiment 7 is the fertilizer composition of any one of Embodiments 1, 2, 4, 5, or 6, wherein: the fertilizer particle is a urea particle; the solid acidic particulate material comprises SSP or TSP, or a combination thereof; and the solid basic particulate material comprises MgO. Embodiment 8 is the fertilizer composition of any of Embodiments 1 to 7, comprising less than 10%, 1 to 5%, or 2 to 3.5% of the solid basic particulate material based on the total weight of the coated fertilizer. Embodiment 9 is the fertilizer composition of any of Embodiments 1 to 8, wherein the particulate coating composition comprises the solid acidic particulate material and the solid basic particulate material at a ratio by weight of 1:100 to 7:10, 1:100 to 2:3, 1:7 to 2:3, or 1:7 to 1:4 in the coating. Embodiment 10 is the fertilizer composition of any of Embodiments 1 to 9, wherein the particulate coating composition is a single layer coating comprising a blend of the solid acidic particulate material and the solid basic particulate material. Embodiment 11 is the fertilizer composition of any of Embodiments 1 to 9, wherein fertilizer particle includes a first coating layer comprising the solid acidic particulate material and a second coating layer comprising the solid basic particulate material such that at least a portion of the first coating layer is positioned between the surface of the fertilizer particle and the second coating layer. Embodiment 12 is the fertilizer composition of any of Embodiments 1 to 11, comprising less than 0.0001 wt. % of a salt formed from the solid acidic particulate material and solid basic particulate material by weight of the fertilizer composition. Embodiment 13 is the fertilizer composition of any of Embodiments 1 to 12, further comprising at least one micronutrient in at least one of the fertilizer particle or particulate coating composition, preferably in an amount of 0.5 to 10 wt. %, 1 to 5 wt. %, or 2 to 4 wt. %, based on the total weight of the coated fertilizer. Embodiment 14 is the fertilizer composition of any one of Embodiments 1 to 13, wherein the composition is a blended fertilizer composition comprising a plurality of the coated fertilizer particles and a plurality of uncoated fertilizer particles. Embodiment 15 is a particulate fertilizer-coating composition comprising a solid acidic particulate material and a solid basic particulate material. Embodiment 16 is the particulate fertilizer-coating composition of Embodiment 15, wherein the solid acidic particulate material comprises a solid acidic fertilizer particulate material. Embodiment 17 is the particulate fertilizer-coating composition of any one of Embodiments 15 to 16, wherein: the solid acidic particulate material comprises at least one of a phosphate-based fertilizer, a biostimulant, a calcium lignosulfonate, or a combination thereof and the solid basic particulate material comprises a metal oxide, preferably MgO, ZnO, CuO, or blends thereof. Embodiment 18 is the particulate fertilizer-coating composition of any one of Embodiments 15 to 17, comprising 0.1 to 20 wt. %, preferably 10 to 20 wt. %, more preferably 14 to 18 wt. %, or most preferably about 16 wt. % of the solid acidic particulate material, and 80 to 99.9 wt. %, preferably 80 to 90 wt. %, more preferably 82 to 86 wt. %, or most preferably about 84 wt. % of the solid basic particulate material. Embodiment 19 is a method of fertilizing, the method comprising applying any one of the fertilizer compositions of Embodiments 1 to 14 to at least one of a soil, an organism, a liquid carrier, a liquid solvent, or a combination thereof.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea.

The term "particle" can include a solid material. A particle can have a variety of different shapes, non-limiting examples of which include a spherical, a puck, an oval, a rod, an oblong, or a random shape. The phrases "fertilizer particle" and "fertilizer granule" can be used interchangeably throughout the specification.

The terms "particulate" or "powder" can include a plurality of particles.

The term "adduct" can be a reaction product of an acid and a base, wherein covalent bonds are created, such as a product where all of the atoms of the reactants are covalently bonded as one molecule, and/or can be a salt, such as an ionically bonded salt product.

The term "reducing" or any variation of this term, when used herein includes any measurable decrease or complete reduction to achieve a desired result.

The terms "about", "approximately", and "substantially" are defined as being close to, as understood by one of ordinary skill in the art. In one non-limiting instance, the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the particulate coating compositions of the present invention is the presence of an acidic particulate material and a basic particulate material. This combination of materials can form a coating composition that can reduce or inhibit chemical reactions from occurring between coated fertilizer particles of the present invention and other fertilizer particles. Thus, fertilizer blends can be safely formed while reducing or eliminating the formation of adducts and/or water in blended fertilizer compositions.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following detailed description and upon reference to the accompanying drawings.

FIGS. 2A and 2B—X-ray powder diffraction (XRD) of coating materials were performed and compared to XRD of a $Mg_3(PO_4)_2$ standard. (A) is a representative XRD of $Mg_3(PO_4)_2$—top line and a premixed mixture of 1 gram of TSP and 2.5 grams of MgO—bottom line. (B) is a representative XRD of MgO alone—top line (corrected), $Mg_3(PO_4)_2$—second line from the top, a premixed mixture of 1 gram of TSP and 2.5 grams of MgO—third line from the top, and TSP alone—bottom line.

Figure 1A:
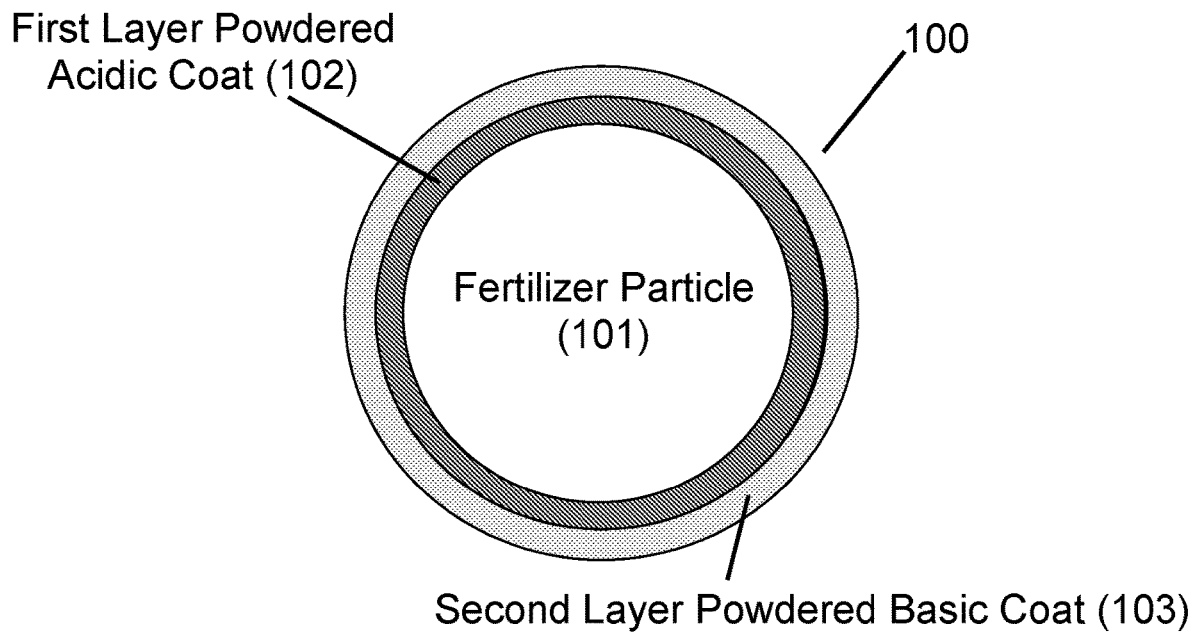
FIGS. 1A and 1B—are representations of coated fertilizer particles of the present invention. (A) is a multi-layered coated fertilizer particle. (B) is a single layer coated fertilizer particle.

While the invention is susceptible to various modifications and alternative forms, specific embodiments thereof are shown by way of example in the drawings. The drawings may not be to scale.

DETAILED DESCRIPTION OF THE INVENTION

The fertilizer-coating compositions and coated fertilizers of the present invention provide an elegant solution to the problems associated with incompatible fertilizer blends. Notably, the particulate fertilizer-coating compositions comprise solid acidic particulate material and solid basic particulate material that are stable when mixed/blended together and do not require liquid materials or drying steps in their production or their use in a given coating process. Rather, simple mixing procedures can be used to produce the coating compositions of the present invention and to coat fertilizer particles with said coating compositions. In some aspects, the coatings reduce or eliminate chemical reactions between other fertilizers. Without wishing to be bound by theory, it is believed that the combination of the solid acidic particulate material and solid basic particulate material does not result in a significant amount or even any reaction products between the acidic and basic particulate material when dry. In some instances, the coatings of the present invention can increase the abrasion resistance and/or increase the tensile strength of the coated fertilizer particles when compared with similar fertilizer particles that do not have such a coating. The fertilizer coating compositions and coated fertilizers can be produced inexpensively, easily, without requiring liquid handling, and on a large scale.

These and other non-limiting aspects of the present invention are discussed in further detail in the following sections with reference to the Figures.

A. Fertilizer Coating

In one embodiment, the composition used to coat a fertilizer contains a solid acidic particulate material and a solid basic particulate material. In some instances, the acidic material and basic material are reactive with each other if either is in contact with the other when in a liquid form. However, they can be unreactive with each other when they are both in solid forms. The solid acidic particulate material and/or solid basic particulate material can contain a fertilizer, macronutrient, micronutrient, and/or biostimulant. In other instances, however, the solid acidic and/or basic particulate material do not have to include fertilizer materials.

In non-limiting aspects, the solid acidic particulate material can contain an acidic phosphate-based fertilizer, biostimulant, calcium lignosulfonate, or a combination thereof. The phosphate-based fertilizer can be a single superphosphate (SSP) particle, a triple super-phosphate (TSP) particle, or a blend of SSP and TSP particles. A biostimulant can be humic acids, amino acids, seaweeds, seaweed extracts, fulvic acids, bacteria, bacterial extracts, fungus, and/or fungal extracts. The amount of the solid acidic particulate material in the coating of the fertilizer or coating composition can be any amount. In some instances, the amount of the solid acidic particulate material can be from 0.01 to 60 wt. %, 0.1 to 50 wt. %, 1 to 40 wt. %, 5 to 30 wt. %, 10 to 20 wt. %, 10 to 16.67 wt. %, 14 to 18 wt. %, or 16 wt. %, or any range thereof of the coating composition. In some instances, the amount of the solid acidic particulate material is less than 20 wt. %, less than 10 wt. %, from 0.1 to 5 wt. %, 0.1 to 3.5 wt. %, 0.2 to 2 wt. %, 0.5 to 1.5 wt. %, 0.5 wt. % of the total weight of the coated fertilizer.

In non-limiting aspects, the solid basic particulate material can include basic nitrogen fertilizers, metal oxides, etc. Non-limiting examples of a metal oxide include oxides of magnesium, manganese, zinc, copper, cobalt, barium, molybdenum, iron, etc. The amount of the solid basic particulate material in the coating of the fertilizer or coating composition can be any amount. In some instances, the amount of the solid basic particulate material in the coating of the fertilizer or coating composition can be from 60 to 99.99 wt. %, 65 to 99.9 wt. %, 70 to 99.9 wt. %, 75 to 99.9 wt. %, 80 to 99.9 wt. %, 80 to 95 wt. %, 80 to 90 wt. %, 82 to 86 wt. %, 83.3 to 90 wt. %, or 84 wt. %, or any range thereof of the coating or coating composition. In some instances, the amount of the solid basic particulate material is less than 20 wt. %, less than 10 wt. %, from 1 to 5 wt. %, 2 to 3.5 wt. %, or 2.5 wt. % of the total weight of the coated fertilizer.

The coating compositions of the present invention can contain micronutrients. In some aspects, the presence of micronutrients can increase the abrasion resistance and the tensile strength of the coating composition. Non-limiting examples of micronutrients include magnesium, calcium, zinc, molybdenum, boron, manganese, sulfur, iron, copper, molybdenum, ZnO, boric oxide ($B_2O_3$), TSP, and/or MgO. In some instances, the micronutrients may be present in the form of inorganic salts. The amount of the micronutrients in the coating composition can be any amount. In some instances, the amount of the micronutrients in the coating of the fertilizer or coating composition can be from 0.01 to 20 wt. %, 0.1 to 15 wt. %, 0.5 to 10 wt. %, 1 to 5 wt. %, 2 to 4 wt. %, or 3 wt. % or any range thereof of the coating or coating composition.

The coating composition can also contain plant protection agents and fillers. Examples of plant protection agents include but are not limited to, insecticides, fungicides, growth regulators, nitrification inhibitors, and any mixtures of them. Examples of fillers include, but are not limited to, clay, peat, etc. Examples of other fertilizer ingredients are for example described in Ullmann's Encyclopedia of Industrial Chemistry, 5$^{th}$ edition, 1987, Volume A10, pages 363 to 401, DE-A-41 28 828, DE-A-19 05 834, or DE-A-196 31 764, which references are hereby incorporated by reference.

B. Method of Making the Fertilizer Coating

The coating(s) and/or coating composition(s) can be made by combining all or some of the components of the coating(s) and/or coating composition(s) and mixing. The solid acidic particulate material and solid basic particulate material can be combined with all, some, or none of the fertilizer particle, micronutrient, plant protection agent, filler, and/or with other fertilizer ingredients, and mixed. If additives are included, the additives can then be added and mixed. Mixing can be performed by any means known, such as stirring, vortexing, homogenizing, shaking, etc. In some instances, the particulate fertilizer-coating composition is a product containing the acidic particulate material and the solid basic particulate material packaged separately from each other, for later mixing or layering in one or multiple layers.

In some instances, each or some of the components are solids. In some instances, each or some of the components are in powdered or particulate form, such that the resulting mixture or blend is in powdered or particulate form. In some instances, the components are anhydrous or substantially anhydrous. In some instances, all or some of the components of the fertilizer coating composition of the present invention contain less than 10, 9, 8, 7, 6, 5, 4, 3, 2, 1, 0.5, or 0.1 wt. %, or 0% of water, or any range therein. Without wishing to be bound by theory, it is believed that the concentrations and/or order of addition of each component creates a composition that is chemically non-reactive, substantially chemically non-reactive, or less chemically reactive with the other components in the blend as compared to a composition that is combined with different concentrations and/or in a different order.

In a coating composition to be used as a single-layered coating, acidic and basic particulate material can be combined together before being coated on the fertilizer particle. The acidic and basic particulate material can be combined together in a process that does not involve liquids. Non-limiting examples include stirring, vortexing, homogenizing, shaking, blending, mixing, etc. The coating materials can be mixed by hand or mixed in a paddle mixer, a rotating drum, or a powder mixer, etc. In another instant, the acidic and basic particulate material can be combined together at the same time that the fertilizer particle is being coated. In some instances, all of the ingredients are combined together at the time of coating using hand mixing or in a powder coater, paddle mixer, a rotating drum, or a powder mixer, etc. The amount of time used to mix the materials can be an amount sufficient to obtain substantially even distribution of the materials throughout the resulting mixture. In some instances, the mixing times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.).

In a coating composition to be used as a multi-layered coating with layers alternating between at least the acidic particulate material and the basic particulate material, the acidic and basic particulate material is not combined before coating. The acidic and basic particulate material can be packaged separately and sold together or separately.

In some instances, the process of the invention may further comprise the step of coating a fertilizer particle with a coating composition disclosed herein. The fertilizer can be a particle of any fertilizer, including the fertilizers disclosed herein. The coating(s) and/or coating composition can be applied to a fertilizer particle by a variety of methods, such as spraying, dust coating, pouring, mixing, blending, etc. The same mixing procedures, times, and/or equipment noted above in making the fertilizer coating composition can be used to coat said coating composition on any given fertilizer particles. Additionally or alternatively the procedures discussed below can be used to coat fertilizer particles.

C. Coated Fertilizer Particles

A wide variety of fertilizer particles can be coated with the coating compositions of the present invention. In some instances, the fertilizer particle can contain a urea-based fertilizer particle, a phosphate-based fertilizer particle, and/or a phosphate-based fertilizer. The urea-based fertilizer particle can be a urea particle. The phosphate-based fertilizer particle can contain SSP, TSP, or a blend of SSP and TSP. In some instances, the phosphate-based fertilizer contains muriate of potash.

Referring to FIG. 1A, the fertilizer coating composition can be structured as a multi-layered coating on a fertilizer particle. The coated fertilizer (100) can contain a first layer (102) in contact with the fertilizer particle (101) that contains the solid acidic particulate material and a second or subsequent layer (103) that contains the solid basic particulate material. Alternatively, the first layer in contact with the fertilizer particle can include the solid basic particulate material and the second layer can be the solid acid particulate material (not shown). The first layer of particulate material can be coated onto the fertilizer particle by using hand mixing or in a powder coater, paddle mixer, a rotating drum, or a powder mixer, etc. The fertilizer particle coated with the first layer of particulate material can then be coated with the second layer of particulate material by hand mixing or in a powder coater, paddle mixer, a rotating drum, or a powder mixer, etc. For each layer, the amount of time used to mix the materials can be an amount sufficient to ensure that a substantially even layer is formed on the fertilizer particle and/or formed on the first layer. In some instances, the mixing times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.).

Figure 1B:
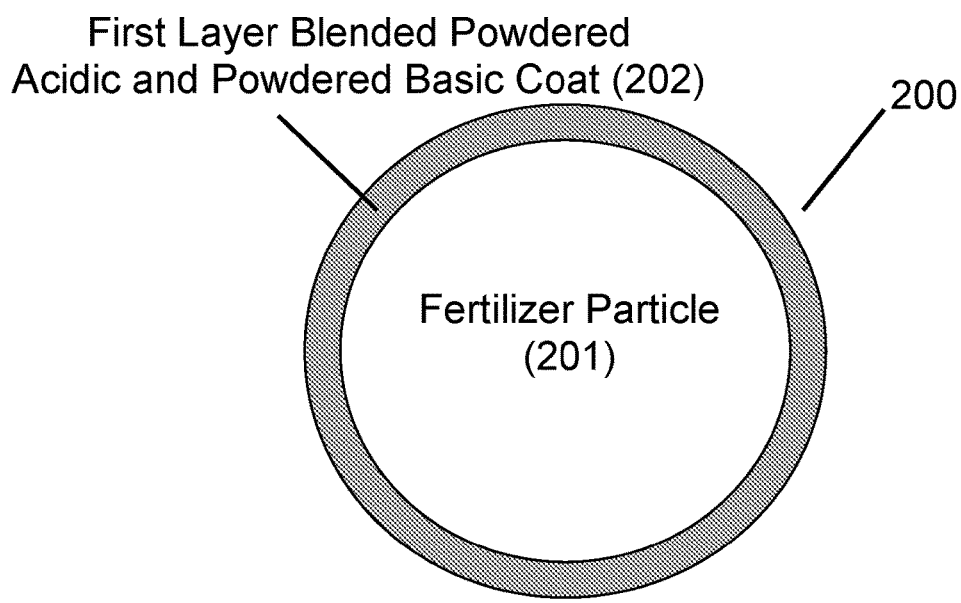

Referring to FIG. 1B, the fertilizer coating composition can be structured as a single-layered coating on a fertilizer particle. The coated fertilizer (200) can contain a layer (202) in which the acidic and basic particulate material can be combined together (e.g., mixed together to form a blend such as in the manner described above). The mixture can then be directly coated onto the surface of the fertilizer particle (201). The fertilizer coating can contain additional layers that do or do not contain a solid acidic particulate material and/or a solid basic particulate material (not shown). The ratios of solid acidic particulate material to solid basic particulate materials in the coating or the coating composition can be any ratio. In some instances, the ratios of solid acidic particulate material to solid basic particulate materials in the coating or the coating composition is 0.1:1000 to 3:2, 0.5:500 to 1:1, 1:100 to 7:10, 1:100 to 2:3, 1:7 to 2:3, or 1:7 to 1:4 by weight in the coating or coating composition. The amount of time used to mix the fertilizer particle with the single-layered coating materials can be an amount sufficient to ensure that a substantially even layer is formed on the fertilizer particle. In some instances, the mixing times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.).

For fertilizer coating compositions structured as a single-layered coating, in some instances, the acidic and basic particulate material can be combined together before being coated on the fertilizer particle. The fertilizer particle can then be coated by the combined acidic and basic particulate material by hand mixing or in a powder coater, paddle mixer, a rotating drum, or a powder mixer, etc. In another instant, the acidic and basic particulate material can be combined together at the same time that the fertilizer particle is being coated. In some instances, all of the ingredients are combined together at the time of coating using hand mixing or in a powder coater, paddle mixer, a rotating drum, or a powder mixer, etc. The amount of time used to perform this mixing step can be the same amount of time as discussed directly above.

In some instances, the solid acidic particulate material and the solid basic particulate material physically contact each other in the coating composition and/or on the coated fertilizer particle. Without wishing to be bound by theory, it is believed that this contact does not cause a chemical reaction and/or does not produce a reaction product. In some instances, the contact produces very little reaction product, such as a salt, from a chemical reaction between the solid acidic particulate material and solid basic particulate material. Further, without wishing to be bound by theory, it is believed that this contact does not produce $H_2O$ or produces very little $H_2O$ from a chemical reaction between the solid acidic particulate material and solid basic particulate material. In some instances the amount of reaction product and/or $H_2O$ produced is less than 0.01. 0.005%, 0.001%, 0.0005%, 0.0001%, 0.00005%, or 0.00001%, or any range therein, by weight of the coated fertilizer composition.

Fertilizers that can be used in the fertilizer coating composition, in the coated fertilizer, as the solid acidic particulate material, as the solid basic particulate material, as the fertilizer particle that is coated, and/or combined with a coated particle in a blended/mixed fertilizer can include nitrogen fertilizers, phosphate fertilizers, alkaline fertilizers, potassium and/or magnesium containing fertilizers, and/or manure, and/or secondary nutrients, and/or trace elements. Examples of nitrogen fertilizers include organic fertilizer containing nitrogen, such as urea, methylene urea, crotonylidene diurea, oxamide, melamine, substituted triazones, ethylene diurea, triuret, and any mixtures of thereof. Easily soluble nitrogen components are, for example, ammonium nitrate, ammonium sulfate, or urea. Examples of phosphate fertilizers can include SSP and TSP. Examples of potassium fertilizers can include muriate of potash (MOP). Fertilizers may contain urea, nitrogen, potassium, phosphorus, and/or magnesium in the form of inorganic salts, or mixtures thereof. Other salts that may be used are, for example, monoammonium phosphate, diammonium phosphate, potassium sulfate, potassium chloride, magnesium sulfate, calcium superphosphate, disodium hydrogen phosphate, ferric chloride, manganese chloride, calcium chloride, magnesium phosphate, ammonia, and potassium oxide. Fertilizers can contain single-nutrient, multi-nutrient, and other possible fertilizer ingredients, for example, it can contain nutrients such as nitrogen, potassium, or phosphorus, individually or in combination. In some instances, the nutrients are in the form of their salts. Examples of these are nitrogen and phosphorous fertilizers (NP), nitrogen and potassium fertilizers (NK), potassium and phosphorous fertilizers (PK), and nitrogen, phosphorus, and potassium fertilizers (NPK), lime nitrate of ammonium, ammonia sulfate, ammonia sulfa-nitrate, and urea. The coated particle can also contain plant protection agents and fillers.

D. Blended Fertilizers

The coated particle(s) and/or coating composition(s) of the present invention can be used as and/or combined with a fertilizer. In some instances, the process of the invention may further comprise the step of mixing the coated particle(s) and/or coating composition(s) with another fertilizer, micronutrient, plant protection agent, filler, and/or with other fertilizer ingredients. In some instances the mixture forms a mixed fertilizer and/or a blended fertilizer. In some instances the coating composition is applied to a fertilizer particle. In some instances, a coated fertilizer particle is combined with other coated fertilizers and/or non-coated fertilizers. In some instances, the coated fertilizer is combined with a phosphate fertilizer, a urea based fertilizer, and/or a potassium based fertilizer to form a fertilizer blend. In some instances, the phosphate fertilizer is SSP, TSP, monoammonium phosphate (MAP), and/or diammonium phosphate (DAP). In some instances, the urea based fertilizer is urea. In some instances, the potassium based fertilizer is muriate of potash (MOP), which is also referred to as potassium chloride (KCl). In some particular instances, the blend can comprise coated particles of the present invention with SSP particles. The blend can comprise coated particles of the present invention with TSP particles. The blend can comprise coated particles of the present invention with SSP and TSP particles. The blend can comprise coated particles of the present invention with MOP particles. The blend can comprise coated particles of the present invention with SSP, TSP, and MOP particles. The blend can comprise coated particles of the present invention with SSP and MOP particles. The blend can comprise coated particles of the present invention with TSP and MOP particles. The blend can comprise coated particles of the present invention with uncoated urea particles. The blend can comprise coated particles of the present invention with uncoated urea particles and MOP particles. The blend can comprises coated particles of the present invention with uncoated urea particles, MAP or DAP particles, and MOP particles. The blend can comprise coated particles of the present invention with SSP particles and MOP particles. The blend can comprise coated particles of the present invention with uncoated urea particles and MAP or DAP particles. In certain aspects, and as illustrated in a non-limiting manner in the Examples, the coated particles of the present invention can be used to prepare blends having a desired NPK grade (e.g., 1:1:0 or 1.5:1:0 or 2:1:0 or 1:2:0 or 1:1:1 or 1.5:1:1 or 2:1:1 or 1:2:2 or any desired N—P—K ratio) for a desired fertilizer application. Without wishing to be bound by theory, it is believed that the stability of the coated particles of the present invention with other fertilizer particles allows for the creation of specifically tailored fertilizer blends for specific fertilizer applications. These blends are storage stable, as there is limited to no risk of having the individual fertilizer particles of the blend degrade when contacted with each other during storage.

E. Use of the Fertilizer Compositions

The coated particle(s) and/or coating composition(s) of the present invention can be used as a fertilizer. The coated particle(s) and/or coating composition(s) can be used alone, in a combined fertilizer mix, or with a separate fertilizer. The coated particle(s) and/or coating composition(s) can be used in a method of fertilizing. The method can include applying a fertilizer composition to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Example 1

Production of Dual Layer Fertilizer Coatings and Single Layer Fertilizer Coatings Described below are non-limiting examples of production of a coating on a fertilizer. Fertilizer particles were coated with either a dual layer (e.g., see FIG. 1A) coating or single layer (e.g., see FIG. 1B) coating containing different concentrations of a solid acidic particulate material and a solid basic particulate material.

The dual layer fertilizer coating was produced by first coating a fertilizer granule, such as urea, with micronized solid acidic particulate material of TSP, SSP, or a combination of the two. It was found that powder coatings with solid acidic particulate material created a firm coating on urea particles. The coated fertilizer was then subsequently coated with solid basic particulate material, such as MgO, which also formed a firm coating. See Table 1.

Single layer fertilizer coatings were produced by coating fertilizers granules, such as urea, with a premixed blends, such as particulate blends containing several different amounts of: micronized TSP and powdered MgO; micronized SSP and powdered MgO; or micronized SSP, micronized TSP, and powdered MgO. See Table 1.

Additional control and test particles were produced and tested that include uncoated particles, particles with commercially available coatings, and/or other ingredients. See Table 1.

Methods of Production:

Dual Layer Coating:

Briefly, a weighed quantity of fertilizer particles to be coated was added in a tumbling drum mixer with a 5 liter capacity. The coating material of the first layer was then added and mixed for less than 30 minutes at ambient temperature and a rate of 30 to 50 rpm. The coating material of the second layer was then added subsequently to the same mixer and mixed again for less than 30 minutes at ambient temperature and a rate of 30 to 50 rpm. After mixing, excess coating powder was removed by sieve and the coated fertilizer particles were stored in air-tight containers.

Single Layer Coating:

Briefly, a weighed quantity of fertilizer particles to be coated were added in a tumbling drum mixer with a 5 liter capacity. The coating material for the single layer, which had been pre mixed in a 500 ml plastic container thoroughly for 10-15 min., was added to tumbling drum mixer over the fertilizer particles to be coated. The coating material and fertilizer particles to be coated were mixed at a drum speed of 30 to 50 rpm for less than 30 minutes at ambient temperature. After mixing, excess coating powder was removed by sieving and the coated fertilizer particles were removed to air-tight containers.

Example 2

Characterization of Coated Fertilizers for Abrasion Resistance

It was found that addition of micronutrients in a coating composition for a fertilizer increased abrasion resistance (decreased the degradation) of the coated fertilizer. Specifically, abrasion resistance was used to determine the resistance to the formation of dust and fines as a result of granule-to-granule and granule-to-equipment contact.

Abrasion Test Protocol:

For abrasion testing, the IFDC S-116 "Abrasion Resistance (Rotary-Drum Method)" was used. Briefly, a coated fertilizer or control particles (samples) were screened through 3.35 and 1.00 mm sieves. A 100 $cm^3$ fraction of the samples between 3.35 mm and 1.00 mm in size were used in the abrasion test. The 100 $cm^3$ fraction (starting material) was weighed and then added to a rotary-drum having dimensions of 6.35 cm in length and 19.05 cm in diameter and having six flights equally spaced around the inner circumference of the drum. 50 stainless steel balls measuring 7.9 mm in diameter with a total weight of approximately 100 g were added to the rotary drum. The drum was closed and rotated at 30 rpm for 5 min. After rotation, the contents of the drum were removed and screened over a 4.75 mm screen to remove the steel balls. The remaining material was screened on a 1.00 mm screen for 5 min. on a Ro-Tap shaker. The material retained on the 1.00 mm screen is then weighed to determine the weight of the non-degraded material. The weight of the non-degraded material and the staring material were used to determine the percent degradation (100−(100× (weight of the non-degraded material÷weight of the starting material))).

Results:

Abrasion resistance was increased for urea particles coated with a combination of TSP and MgO as compared to urea alone, and in most instances was also increased over urea coated with the commercially available Fertibon. See Table 1.

Example 3

Characterization of Coated Fertilizers for Chemical Compatibility

Compatibility of materials is important in any bulk-blending or NPK granulation system. Control and coated fertilizer particles were tested for chemical compatibility by the ability of blends of two or more fertilizers to remain dry and free flowing. Incompatibility was evidenced by wetting, caking, gas evolution, or particle disintegration. Each sample was tested for water content, tackiness, and color loss (an indication of a chemical reaction occurring) using the IFDC protocol (IFDC S-104) at multiple days during the trial. Samples stable for more than 2 months were qualified as successful experiments.

The results demonstrate that the coatings containing solid particulate acid material and solid particulate basic material did not react with each other and increased the compatibility of the underlying coated fertilizer with other fertilizers.

Compatibility Protocol:

For compatibility testing, the IFDC S-104 "Chemical Compatibility in Blends" was used. Uncoated fertilizer particles or fertilizer particles coated with solid acidic particulate, solid basic particulate, commercially available coatings, oils, paraffin, etc., and combinations thereof were tested for compatibility with an additional fertilizer (second fertilizer). Table 1 shows the coated particles tested, the second fertilizer added to determine compatibility, and the compatibility results.

Briefly, the ingredients of each testing sample was combined and blended in a 200 ml glass bottle with the second fertilizer. The total sample occupied approximately two-thirds of the glass bottle. The freshly made blend sample was tightly capped in the glass bottle and placed in an oven at 30° C. for at least 30 days. The storage temperature and period may have been changed as deemed necessary, which is noted in Table 1 when appropriate. The blends were inspected daily, and any wetting, caking, disintegration, or gas evolution was noted.

The general guidelines for rating compatibility were as follows:

D=Dry, Free flowing—(Compatible) Pass;
W1=moisture patches, but usable—(Predominantly Compatible) Pass;
W2=moist and slightly sticky, but probably usable—(Predominantly Compatible) Pass;
W3=wet through and sticky, unsuitable for use—(Predominantly Incompatible) Fail;
W4=very wet, unsuitable for use—(Incompatible) Fail;
H=hard caked together, unsuitable for use—(Incompatible) Fail The commercial coatings tested included: Ureflo-50, supplied by Filtra/Dorf Ketal Chemicals Pvt Ltd. (India), which contains metal sulfate and diethylene glycol; and Fertibon, supplied by Fertibon Products (India). The commercial coatings were obtained by the supplier as liquids. The urea particles were coated with the commercial coatings at the manufacturers recommended amount (0.05 wt. % of the coated particle). The coatings were created generally by charging 200 ml of water in plastic bottles with 0.75 g (0.05% loading) of the liquid commercial coating material. The water dispersion obtained was homogenized at 8,000 rpm for 10 min. to obtain a uniform dispersion. 1.5 kg of urea granules were charged and preheated at 50° C. with hot air flow (250 $m^3$/hr) for 15 min in a Fluid bed granulator (BOSCH). The coating dispersion was pumped into the fluid bed granulator using a peristaltic pump at a rate of 10 ml/min. through spray nozzles to coat the urea granules (Microclimate air pressure: 0.07 bar, spray air pressure: 0.14 bar maintained till the spraying was complete). After completion, the coated granules were subjected to drying in the same equipment at 50-55° C. for 20-25 min., then discharged, cooled, and stored in a plastic container.

Results:

When untreated urea and SSP, 60 g each, were blended together and subjected to IFDC S-104 protocol, there was a lot of moisture pick-up. However, if urea, SSP, and TSP, 40 g each, were blended all together & subjected to IFDC S104 protocol, surprisingly there was negligible moisture pick-up observed but white patches were observed on the TSP with little caking after 40 days. When, urea was coated with micronized TSP alone, the coating was firm and improvements were seen in anti-caking over urea alone when the coated fertilizer was combined with TSP or SSP but the TSP coated urea was not found to be compatible for 2 months. However, when the TSP coated urea was then further coated with MgO, the coating was firm and was stable for up to over 2 months when combined with uncoated TSP or SSP. Increased stability was also found when urea was coated with a single layer of a premix blend of TSP and MgO and combined with uncoated TSP or SSP. Additional combinations of solid acidic particulate, solid basic particulate, commercially available coatings, oils, paraffin, etc. were tested for comparison. The results are shown in Table 1.

Surprisingly, coatings with combinations of solid acidic particulate and solid basic particulate outperformed: several commercially available coatings and outperformed coatings with solid acidic particulate alone or with filler, solid basic particulate alone, phosphate salts with or without TSP, oils, and paraffin. More surprisingly, coatings with combinations of solid acidic particulate and solid basic particulate also outperformed coatings of $Mg_3(PO_4)_2$ with our without TSP, as $Mg_3(PO_4)_2$ is a salt that is produced in a SSP or TSP reaction with MgO. Further surprisingly, coatings with combinations of solid acidic particulate and solid basic particulate also outperformed coatings of CaO and $CaSO_4$ with or without TSP.

These experiments demonstrate that coating compositions and coated fertilizer particles of the present invention are stable, chemical compatibility with other fertilizers, abrasion resistant, and outperform commercially available coatings.

TABLE 1

| | Coated Particle (60 g, unless otherwise indicated | | Condition of Blend with Second Fertilizer under IFDC S-104 Exposure (No. of exposed Days = Condition during exposure *) | | Abrasion Resistance |
|---|---|---|---|---|---|
| | ("UOI") (wt. % of the Coated Particle) | | TSP | SSP | (IFDC S-116) |
| No. | Core | First Layer | Second Layer | (60 g, UOI) | (60 g, UOI) | (% Degradation) |
| 1 | Urea | | | 1-4 = D<br>5-90 = H, P | 1-4 = W2<br>5-90 = W4 | 0.1016% |
| 2 | Urea (40 g) | | | TSP (40 g) + SSP (40 g)<br>1-4 = D; 5-90 = H, P | | Not done/Failed in protocol S104 |
| 3 | Urea | Fertibon 0.05% | | 1-4 = D<br>5-90 = H, P | 1-4 = W2<br>5-60 = W4 | 0.3273% |
| 4 | Urea | Ureflo-50 0.05% | | 1-4 = D<br>5-50 = H, P | 1-4 = W2<br>5-60 = W4 | Not done/Failed in protocol S104 |
| 5 | Urea | MgO 3.0% | | 1-4 = D<br>5-90 = D | 1-4 = D<br>5-90 = D | 0.8721% |
| 6 | Urea | MgO 2.5% | | | 1-4 = D<br>5-90 = D | 0.7087% |
| 7 | Urea | TSP 1% | | 1-4 = D<br>5-90 = H, P | 1-4 = W1<br>5-60 = W4 | Not done/Failed in protocol S104 |
| 8 | Urea | TSP 1.0% + Kaoline 3.0% | | 1-4 = D<br>5-90 = H, P | | Not done/Failed in protocol S104 |
| 9 | Urea | SSP 1% | | 1-4 = D<br>5-90 = H, P | 1-4 = W1<br>5-90 = W4 | Not done/Failed in protocol S104 |
| 10 | Urea | $Mg_3(PO_4)_2$ 2.5% | | | 1-4 = W1<br>5-20 = W2<br>21-90 = W4 | Not done/Failed in protocol S104 |
| 11 | Urea | TSP 0.5% + $Mg_3(PO_4)_2$ 2.5% | | | 1-4 = W1<br>5-20 = W2<br>21-90 = W4 | Not done/Failed in protocol S104 |
| 12 | Urea | TSP 2.0% | MgO 3.5% | 1-4 = D<br>5-90 = D | 1-4 = D<br>5-90 = D | 1.3102% |
| 13 | Urea | TSP 1.0% | MgO 3.5% | 1-4 = D<br>5-90 = D | 1-4 = D<br>5-90 = D | 0.9212% |
| 14 | Urea | TSP 1.0% | MgO 2.5% | 1-4 = D<br>5-90 = D | | 0.4431% |
| 15 | Urea | TSP 1.0% | MgO 2.0% | | 1-4 = D<br>5-90 = D | 0.2971% |
| 16 | Urea | TSP 0.5% | MgO 3.0% | 1-4 = D<br>5-90 = D | 1-4 = D<br>5-90 = D | 0.6219% |
| 17 | Urea | TSP 0.5% | MgO 2.5% | 1-4 = D<br>5-90 = D | 1-4 = D<br>5-90 = D | 0.38% |
| 18 | Urea | TSP 0.5% | MgO 2.0% | 1-4 = D<br>5-90 = D | 1-4 = D<br>5-90 = D | 0.64% |
| 19 | Urea | TSP 0.5% | MgO 2.5% + CuO 1% | | 1-4 = D<br>5-60 = D | 0.821% |
| 20 | Urea | TSP 0.5% | MgO 2.0% + ZnO 1% | | 1-4 = D<br>5-60 = D | 0.821% |
| 21 | Urea | TSP 1.0% + MgO 3.0% | | 1-4 = D<br>5-90 = D | 1-4 = D<br>5-90 = D | 0.8723% |
| 22 | Urea | TSP 1.0% + MgO 2.5% | | 1-4 = D<br>5-90 = D | 1-4 = D<br>5-90 = D | 0.3723% |
| 23 | Urea | TSP 0.5% + MgO 3.0% | | 1-4 = D<br>5-90 = D | | 0.4723% |

TABLE 1-continued

| | Coated Particle (60 g, unless otherwise indicated) | | | Condition of Blend with Second Fertilizer under IFDC S-104 Exposure (No. of exposed Days = Condition during exposure *) | | Abrasion Resistance |
|---|---|---|---|---|---|---|
| | ("UOI")) (wt. % of the Coated Particle) | | | TSP | SSP | (IFDC S-116) |
| No. | Core | First Layer | Second Layer | (60 g, UOI) | (60 g, UOI) | (% Degradation) |
| 24 | Urea | TSP 0.5% + MgO 2.5% | | 1-4 = D 5-90 = D | 1-4 = D 5-90 = D Blend with MOP 1-4 = D; 5-90 = D | 0.4723% |
| 25 | Urea | TSP 0.5% + MgO 2.0% | | 1-4 = D 5-90 = D | 1-4 = D 5-90 = D | 0.4431% |
| 26 | Urea | SSP 1.0% + MgO 2.5% | | 1-4 = D 5-90 = D | 1-4 = D 5-90 = D | 0.3725% |
| 27 | Urea | TSP 1.0% + SSP 1.0% + MgO 2.5% | | 1-4 = D 5-90 = D | Blend with MOP 1-4 = D; 5-90 = D Blend with TSP + SSP + MOP 1-4 = D; 5-90 = D | 1.23% |
| 28 | TSP | MgO 2.5% | | | Blend with Urea 1-4 = D; 5-90 = D Blend with MOP 1-4 = D; 5-90 = D Blend with Urea + MOP 1-4 = D; 5-90 = D | 0.2351% |
| 29 | SSP | MgO 2.5% | | | Blend with Urea 1-4 = D; 5-90 = D Blend with MOP 1-4 = D; 5-90 = D Blend with Urea + MOP 1-4 = D; 5-90 = D | 0.2152% |
| 30 | Urea + TSP + MOP | TSP 0.5% + MgO 2.5% | | No Second Fertilizer Added 1-4 = D; 5-90 = D | | 0.3742% |
| 31 | Urea | CaO 2.5% | | 1-4 = D 5-30 = D 31-90 = D, P | 1-4 = W1 5-30 = W2 31-90 = W4 | Not done/Failed in protocol S104 |
| 32 | Urea | TSP 0.5% + CaO 2.5% | | 1-4 = D 5-90 = D | 1-4 = W1 5-30 = W2 31-90 = W3/W4 | Not done/Failed in protocol S104 with SSP |
| 33 | Urea | CaSO$_4$ 1.5% | | | 1-4 = W1 5-60 = W4 | Not done/Failed in protocol S104 |
| 34 | Urea | CaSO$_4$ 2.5% | | | 1-4 = W1 5-60 = W4 | Not done/Failed in protocol S104 |
| 35 | Urea | TSP 1.0% + CaSO$_4$ 1.0% | | | 1-4 = W1 5-60 = W4 | Not done/Failed in protocol S104 |
| 36 | Urea | Ca$_3$(PO4)$_2$ 2.5% | | | 1-4 = W1 5-60 = W4 | Not done/Failed in protocol S104 |
| 37 | Urea | TSP 0.5% + Ca$_3$(PO4)$_2$ 2.5% | | | 1-4 = W1 5-60 = W3/W4 | Not done/Failed in protocol S104 |
| 38 | Urea | Palm Oil 0.2% | | 1-4 = D 5-60 = H, P | 1-4 = W1 5-60 = W4 | Not done/Failed in protocol S104 |
| 39 | Urea | Heavy Paraffin 0.2% + SDS 0.01% + HPMC 0.02% | | 1-4 = D 5-60 = H, P | 1-4 = W1 5-60 = W4 | Not done/Failed in protocol S104 |
| 40 | Urea | SSP 0.5% + MgO 2.5% | | Blend with Urea + SSP: (40 g + 60 g) Grade: 17:10:0 NPK 1-4 = D; 5-90 = D | | 0.375% |
| 41 | Urea | SSP 0.5% + MgO 2.5% | | Blend with Urea + DAP + KCl 27 g + 41 g + 32 g Grade: 19:19:19 NPK 1-4 = D; 5-90 = D | | 0.375% |
| 42 | Urea | SSP 0.5% + MgO 2.5% | | Blend with Urea + SSP + KCl 21 g + 64 g + 14 g Grade: 10:10:8 NPK 1-4 = D; 5-90 = W2 | | 0.375% |

TABLE 1-continued

| | Coated Particle (60 g, unless otherwise indicated) | | | Condition of Blend with Second Fertilizer under IFDC S-104 Exposure (No. of exposed Days = Condition during exposure *) | | Abrasion Resistance |
|---|---|---|---|---|---|---|
| | ("UOI")) (wt. % of the Coated Particle) | | | TSP | SSP | (IFDC S-116) |
| No. | Core | First Layer | Second Layer | (60 g, UOI) | (60 g, UOI) | (% Degradation) |
| 43 | Urea | SSP 0.5% + MgO 2.5% | | Blend with Urea + DAP 40 g + 60 g Grade: 28:28:0 NPK 1-4 = D; 5-90 = D | | 0.375% |

HPMC = (Hydroxypropyl) methyl cellulose;
SDS = Sodium dodecyl sulfate
* Condition codes (Samples were observed on a daily basis):
D = Dry, Free flowing - Pass - all samples were D until the first day indicated otherwise;
W1 = moisture patches, but usable - Pass;
W2 = moist and slightly sticky, but probably usable - Pass;
W3 = wet through and sticky, unsuitable for use - Fail;
W4 = very wet, unsuitable for use - Fail;
H = hard caked together, unsuitable for use - Fail
P = white patches on the Second Fertilizer Example 4

Reactivity of the Coating Ingredients

Attempts to create a protective coating in the past have included chemically reacting an acid with a base on the surface of a fertilizer by combining at least one of the coating ingredients as a liquid. It was surprisingly found by the inventors herein that a combination of a solid acidic particulate and a solid basic particulate can produce a protective coating on a fertilizer. The mixture of a solid acidic particulate and a solid basic particulate was tested to determine if the acidic and basic particulates react when combined. Specifically, fertilizer coating compositions were tested for production of $Mg_3(PO_4)_2$, an expected reaction product if acidic particulate material, TSP or SSP, and basic particulate material, MgO, in the coating composition chemically reacted with each other. No reaction product was detected.

Chemical Analysis:

X-ray powder diffraction was performed on several of the mixes and compared to a $Mg_3(PO_4)_2$ standard to determine if the solid acidic particulate and solid basic particulate reacted to form a salt. XRD measurements were made using an X-ray diffractometer (Bruker D-8 Advance X-ray powder Diffractometer) having Cu Kα radiation (1=1.5418 Å) with a nickel filter and a scintillation detector. The samples were scanned in 2Φ range of 5°-80° with a scanning rate of 0.020° per minute.

Figure 2A:
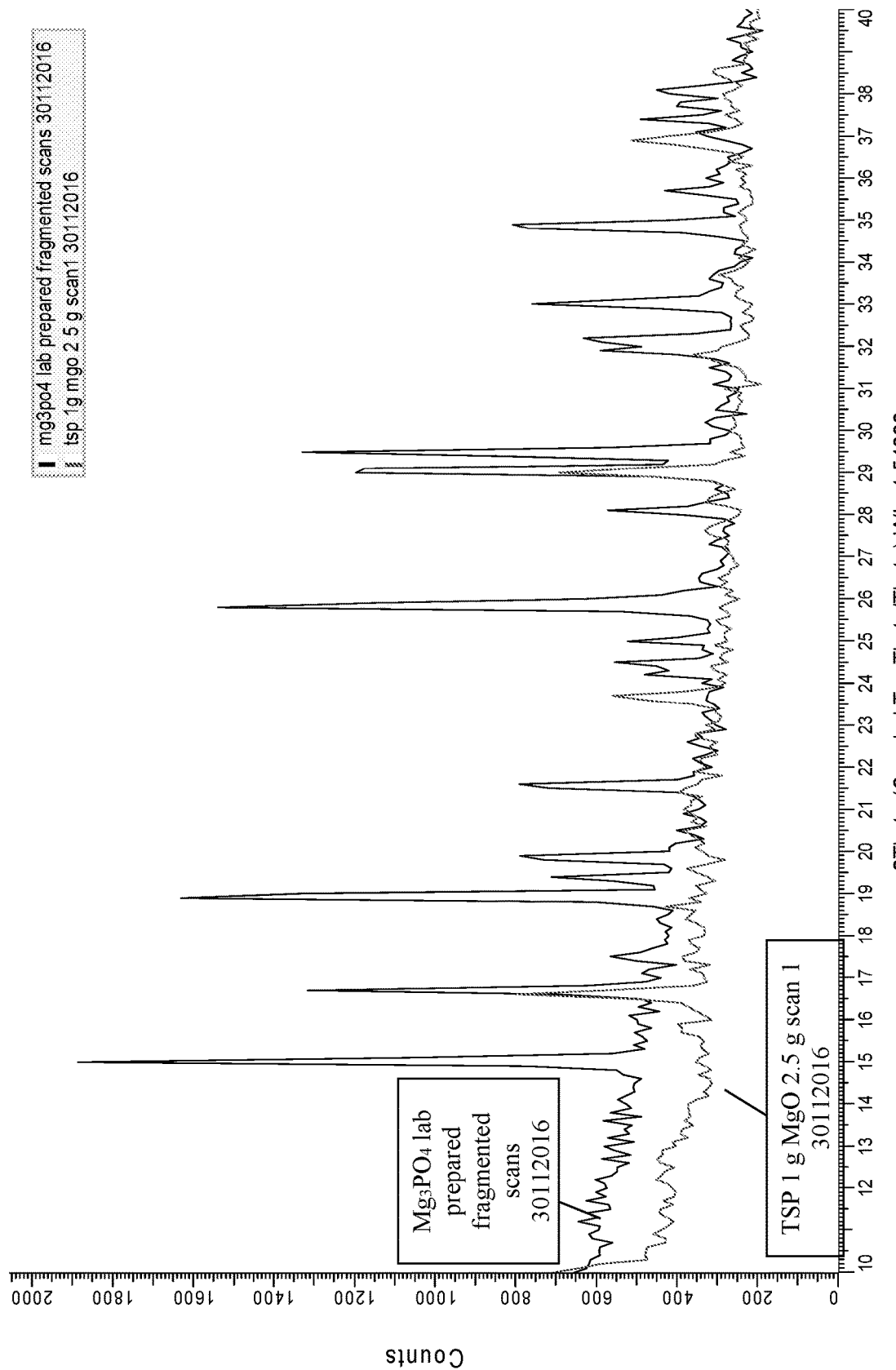
Figure 2B:
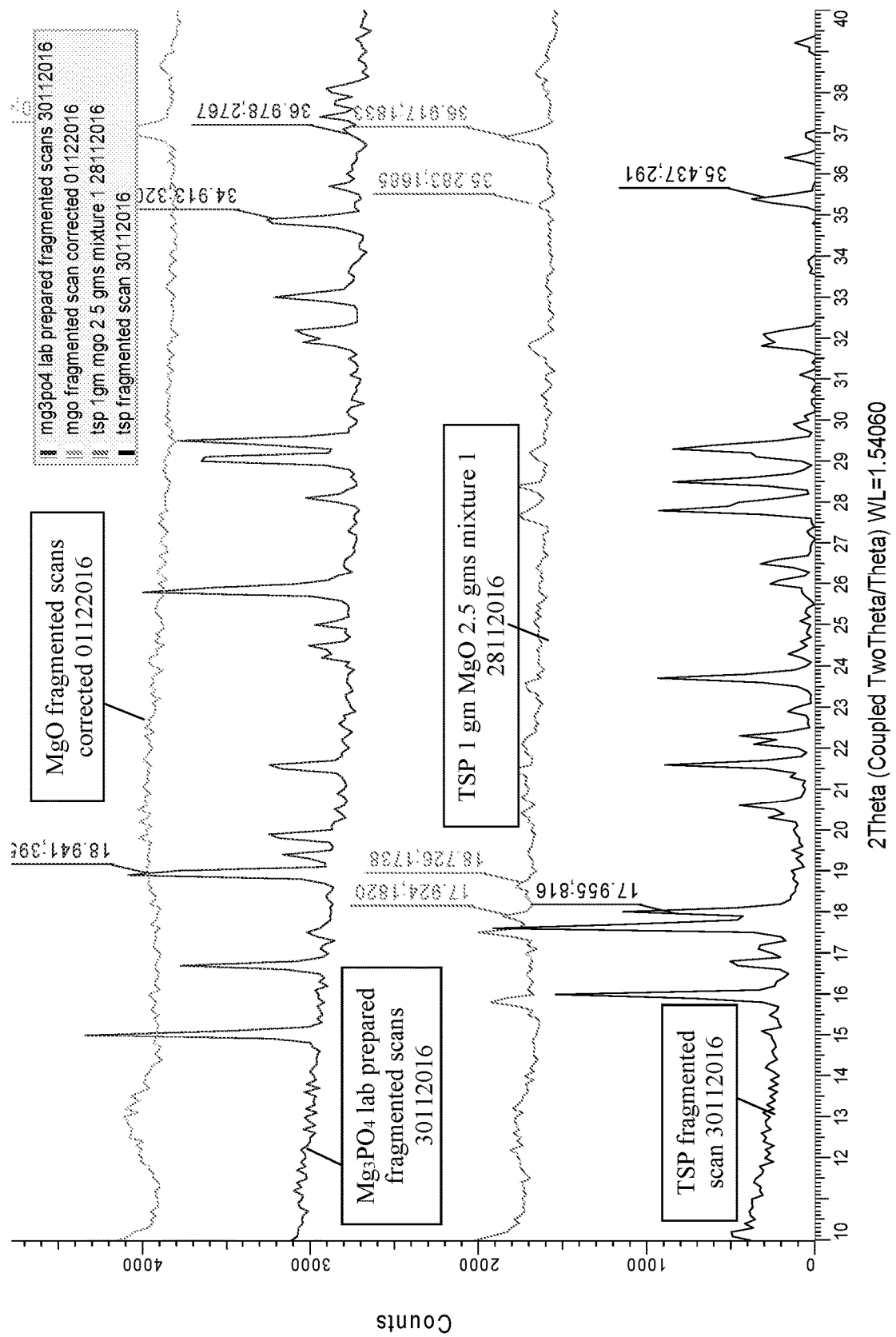

Results:

It was found that the combinations of micronized TSP and MgO as well as TSP alone contained very little to no $Mg_3(PO_4)_2$. See FIG. 2A and FIG. 2B. Accordingly, no reaction appears to be occurring between the TSP and MgO in a premixed combination. This further supports the stability of the coatings of the present invention and supports that the production of a salt between an acid and base is not necessary for the observed compatibility.

The invention claimed is:

1. A fertilizer composition comprising a fertilizer particle having at least a portion of its surface coated with a particulate coating composition comprising a solid acidic particulate material and a solid basic particulate material, wherein the solid acidic particulate material comprises a phosphate-based fertilizer selected from a solid particulate single super phosphate (SSP), a solid particulate triple super phosphate (TSP), or a blend of solid particulate SSP and solid particulate TSP.

2. The fertilizer composition of claim 1, wherein the fertilizer particle is a urea-based fertilizer particle or a phosphate-based fertilizer particle.

3. The fertilizer composition of claim 2, wherein the fertilizer particle comprises a single superphosphate (SSP), a triple super-phosphate (TSP), or a combination thereof.

4. The fertilizer composition of claim 1, wherein the solid acidic particulate material further comprises at least one of a biostimulant, a calcium lignosulfonate, or a combination thereof.

5. The fertilizer composition of claim 1, wherein the solid acidic particulate material comprises a blend of solid particulate SSP and solid particulate TSP.

6. The fertilizer composition of claim 1, wherein the solid basic particulate material comprises a metal oxide.

7. The fertilizer composition of claim 6, wherein the metal oxide is MgO, ZnO, CuO, or blends thereof.

8. The fertilizer composition of claim 1, wherein:
the fertilizer particle is a urea particle;
the solid acidic particulate material comprises SSP or TSP, or a combination thereof; and
the solid basic particulate material comprises MgO.

9. The fertilizer composition of claim 1, comprising less than 10%, 1 to 5%, or 2 to 3.5% of the solid basic particulate material based on the total weight of the coated fertilizer.

10. The fertilizer composition of claim 1, wherein the particulate coating composition comprises the solid acidic particulate material and the solid basic particulate material at a ratio by weight of 1:100 to 7:10, 1:100 to 2:3, 1:7 to 2:3, or 1:7 to 1:4 in the coating.

11. The fertilizer composition of claim 1, wherein the particulate coating composition is a single layer coating comprising a blend of the solid acidic particulate material and the solid basic particulate material.

12. The fertilizer composition claim 1, wherein the fertilizer particle includes a first coating layer comprising the solid acidic particulate material and a second coating layer comprising the solid basic particulate material such that at least a portion of the first coating layer is positioned between the surface of the fertilizer particle and the second coating layer.

13. The fertilizer composition of claim 1, comprising less than 0.0001 wt. % of a salt formed from the solid acidic particulate material and solid basic particulate material by weight of the fertilizer composition.

14. The fertilizer composition of claim 1, further comprising at least one micronutrient in at least one of the fertilizer particle or particulate coating composition, in an amount of 0.5 to 10 wt. %, 1 to 5 wt. %, or 2 to 4 wt. %, based on the total weight of the coated fertilizer.

15. The fertilizer composition of claim 1, wherein the composition is a blended fertilizer composition comprising a plurality of the coated fertilizer particles and a plurality of uncoated fertilizer particles.

16. A method of fertilizing, the method comprising applying the fertilizer composition of claim 1 to at least one of a soil, an organism, a liquid carrier, a liquid solvent, or a combination thereof.

* * * * *